United States Patent
Vawter

(10) Patent No.: US 7,336,855 B1
(45) Date of Patent: Feb. 26, 2008

(54) INTEGRATION OF A WAVEGUIDE SELF-ELECTROOPTIC EFFECT DEVICE AND A VERTICALLY COUPLED INTERCONNECT WAVEGUIDE

(75) Inventor: G. Allen Vawter, Corrales, NM (US)

(73) Assignee: Sandia Corporation, Albuquerque, NM (US)

(*) Notice: Subject to any disclaimer, the term of this patent is extended or adjusted under 35 U.S.C. 154(b) by 279 days.

(21) Appl. No.: 11/300,557

(22) Filed: Dec. 13, 2005

(51) Int. Cl.
*G02B 6/42* (2006.01)

(52) U.S. Cl. .............................. 385/9; 385/14; 385/37

(58) Field of Classification Search ................ 385/50, 385/37, 9; 438/31; 257/14; 372/6, 45.1
See application file for complete search history.

(56) References Cited

U.S. PATENT DOCUMENTS

| | | | |
|---|---|---|---|
| 4,764,889 A * | 8/1988 | Hinton et al. ............... | 708/801 |
| 4,904,859 A * | 2/1990 | Goossen et al. ............ | 250/214 R |
| 5,126,553 A | 6/1992 | England et al. | |
| 5,311,008 A * | 5/1994 | Miller .......................... | 250/214 LS |
| 5,414,541 A * | 5/1995 | Patel et al. ................. | 349/196 |
| 5,862,288 A * | 1/1999 | Tayag et al. ................ | 385/129 |

OTHER PUBLICATIONS

Miller, D. A. B. et al., "Novel hybrid optically bistable switch: The quantum well self-electro-optic effect device," Applied Physics Letters, vol. 45, No. 1, Jul. 1, 1984, pp. 13-15.

Miller, D. A. B., "Optical Switching Devices: Some Basic Concepts," Optical Computing, eds. B.S. Wherrett et al., Proceedings of the 34th Scottish Universities Summer School in Physics, Edinburgh, Aug. 1988 (Adam Hilger, Bristol, 1989), pp. 55-70.

Miller, David A. B. et al., "The Quantum Well Self-Electrooptic Effect Device: Optoelectronic Bistability and Oscillation, and Self-Linearized Modulation," IEEE Journal of Quantum Electronics, vol. QE-21, No. 9, Sep. 1985, pp. 1462-1476.

Neitzert, H. C. et al., "Self-electro-optic effect device in waveguiding configuration as optical switch and power discriminator," Electronics Letters, Jan. 19, 1995, vol. 31, No. 2, pp. 97-99.

Sakouri, Ali et al., "Water-Fused Optoelectronics for Switching," Journal of Lightwave Technology, vol. 16, No. 12, Dec. 1998, pp. 2236-2242.

Shimomura, Kazuhiko et al., "Semiconductor Waveguide Optical Switches and Modulators," Fiber and Integrated Optics, vol. 13, No. 1, 1994, pp. 65-100.

Tang, Jason D. et al., Photonic Encryption using All Optical Logic, Sandia National Laboratories, SAND2003-4474, Unlimited Release, Dec. 2003, pp. 1-48.

(Continued)

*Primary Examiner*—Frank G. Font
*Assistant Examiner*—James P. Hughes
(74) *Attorney, Agent, or Firm*—John P. Hohimer

(57) ABSTRACT

A self-electrooptic effect device ("SEED") is integrated with waveguide interconnects through the use of vertical directional couplers. Light initially propagating in the interconnect waveguide is vertically coupled to the active waveguide layer of the SEED and, if the SEED is in the transparent state, the light is coupled back to the interconnect waveguide.

30 Claims, 7 Drawing Sheets

OTHER PUBLICATIONS

Yamada, Minoru et al., "Analysis of an Integrated Twin-Guide Laser with Coupled-Wave Theory," IEEE Journal of Quantum Electronics, vol. QE-13, No. 4, Apr. 1977, pp. 201-206.

Yu, Song et al., "Implementations of Smart Pixels for Optoelectronic Processors and Interconnection Systems II: SEED-Based Technology and Comparison with Optoelectronic Gates," Journal of Lightwave Technology, vol. 11, No. 10, Oct. 1993, pp. 1670-1680.

Aasmund Sv Sudbo, "Film mode matching: a versatile numerical method for vector mode field calculations in dielectric waveguides," Pure Appl. Opt. 2, (1993) pp. 211-233.

* cited by examiner

INTEGRATION OF A WAVEGUIDE SELF-ELECTROOPTIC EFFECT DEVICE AND A VERTICALLY COUPLED INTERCONNECT WAVEGUIDE

GOVERNMENT RIGHTS STATEMENT

This invention was developed under Contract DE-AC04-94AL85000 between Sandia Corporation and the U.S. Department of Energy. The U.S. Government has certain rights in this invention.

BACKGROUND

1. Field of Invention

This invention relates generally to self-electrooptic effect devices and, more particularly, to the integration of waveguide self-electrooptic effect devices with other waveguides.

2. Description of the Related Art

Self-electrooptic effect devices ("SEEDs") are optoelectronic devices that exhibit optical bistability based on the intensity of incident light. The operation of a SEED using multiple quantum well ("MQW") material has been well described, for example, by D. A. B. Miller et al. in "Novel hybrid optically bistable switch: The quantum well self-electro-optic effect device," Appl. Phys. Lett. 45 (1), 1 Jul. 1984. SEEDs have received attention because of their potential for use as components of optical logic circuits. In these proposed circuits, SEEDs typically implement the logic functions and the SEEDs are optically interconnected by some means, thus forming a potentially complex logic circuit.

SEEDs have two basic geometries: surface-normal SEEDs and waveguide SEEDs. In surface-normal SEEDs, the incoming light is incident normal to the surface of the SEED (and also to the semiconductor substrate carrying the SEED). Therefore, optical logic circuits based on surface-normal SEEDs typically route optical signals in the third dimension (i.e., in the out-of-plane or z-dimension if the substrate of the SEED lies in the x-y plane). For example, SEEDs can be fabricated on two separate substrates and free-space optical elements used to couple optical signals back and forth between the substrates. Alternately, turning mirrors can be used to bend the optical path from the z-direction (normal to the substrate surface) to a direction in the x-y plane (parallel to the substrate surface). Regardless of the selected approach, the basic geometry of surface-normal SEEDs complicates the interconnection task due to the out-of-plane aspect.

In contrast to surface-normal SEEDs, in waveguide SEEDs, the incoming light propagates parallel to or within the plane of the semiconductor substrate, thus reducing or eliminating the need for out-of-plane light routing elements. Waveguide SEEDs operating at 1.55 µm wavelength have been demonstrated. For example, H. C. Neitzert et al. in *"Self-electro-optic effect device in waveguiding configuration as optical switch and power discriminator,"* Electron. Lett. 31 (2), 19 Jan. 1995, shows SEED operation of a MQW waveguide using InGaAs/InP. Twenty quantum wells were used to form a Wannier-Stark modulator with 4:1 contrast in an all-optical hysteresis loop. Although Neitzert does not connect his SEED devices into an optical circuit, the elimination of the out-of-plane geometry overcomes the problems of interconnecting surface-normal SEEDs.

However, the in-plane interconnection of waveguide SEEDs faces other challenges. The light routing elements preferably would transport light between SEEDs and would couple light to and from SEEDs in a low loss fashion, enabling a mesh of interconnected SEEDs while reducing the presence of interference or crosstalk. In addition, the fabrication process for the light routing elements and the devices that couple these elements with the SEEDs preferably would be simple and compatible with the fabrication process for SEEDs. The general approach preferably would also be scalable to allow for the interconnection of a large number of SEEDs.

In one approach, waveguide SEEDs are butt-coupled to passive waveguides. The core of the passive waveguide is aligned with the waveguide portion of the waveguide SEED. One fabrication approach is to first grow the layers required for the SEEDs. Then, in areas where passive waveguides are desired, the active SEED material is etched away and passive epitaxial material is regrown to form a passive waveguide between active SEEDs. However, since regrowth involves the complete removal of the active material and its replacement with new material, the complexity of this method leads to a low yield of functional circuits and a corresponding increase in cost per circuit. This problem is compounded as the complexity of circuits increases, thus limiting the scalability of this approach.

An approach for integrating active waveguide SEED elements with passive waveguide interconnects is to use selective-area disordering of the MQW in the regions intended to become the passive interconnects. However, disordering does not allow for removal of doping species or for the reconfiguration of the waveguide. The impurity doping required to electrically bias the SEED typically causes increased absorptive losses of light propagation in the waveguide. In the case of even moderately complex optical circuits, these losses can quickly reach a level where little usable light remains in the circuit. Similarly, layered structures designed as SEEDs are generally not ideal waveguides for propagation of light in a circuit. Thus, a SEED optical circuit preferably would use specialized optical interconnect waveguides with low loss (i.e., low or no doping) and good mode confinement (i.e., a layer structure suited to propagation of a single optical mode of reasonable lateral extent.)

Accordingly, there is a need for approaches for coupling doped SEEDs with undoped waveguides. There is also a need for compact, high-performance optical logic circuits that use waveguide SEEDs coupled with low-loss optical interconnects.

SUMMARY OF THE INVENTION

The present invention overcomes the limitations of the prior art by providing an integration of waveguide SEEDs with waveguide interconnects. The SEEDs and waveguides are coupled by vertical directional coupling.

In one implementation, such a SEED device includes a waveguide and a waveguide SEED fabricated on the same substrate. The active waveguide layer in the SEED is positioned to form a vertical directional coupler with the waveguide. In this way, light initially propagating in the waveguide will couple to the active waveguide layer of the SEED (via evanescent coupling), interact with the SEED and, if the SEED is in the transparent state, will be coupled back down to the waveguide.

In one variation, light is laterally confined in the waveguide by a rib layer, which also serves as a spacer layer between the core of the waveguide and the active waveguide layer of the SEED. The SEED itself is fabricated as a mesa, with the spacer layer, active waveguide layer and top cladding layer all being part of the mesa. In addition, trenches on both sides of the SEED mesa further can serve to laterally confine the propagating light within the SEED. The length of the trenches preferably is chosen to reduce reflections and decrease associated loss.

Other aspects of the invention include optical logic devices and photonic logic circuits using these types of SEED devices.

DETAILED DESCRIPTION OF THE PREFERRED EMBODIMENTS

The SEED circuits described herein use the concept of a vertical directional coupler. The principles of vertical directional couplers have been described, for example, by K. Shimomura and S. Arai in "Semiconductor waveguide optical switches and modulators," Fiber and Integrated Optics, vol. 13, no. 1, pp. 65-100, January 1994, and Shakouri, Liu et al. in "Wafer-fused Optoelectronics for Switching," Journal of Lightwave Technology, vol. 16, no. 12, pp. 2236-2242, December 1998. Two optical waveguides having similar modal effective refractive indices are positioned atop one another with a spacer layer of waveguide cladding material separating the two guide layers. The device obeys the well-known principal of evanescent coupling of optical power between two similar single-mode optical waveguides.

Figure 1:
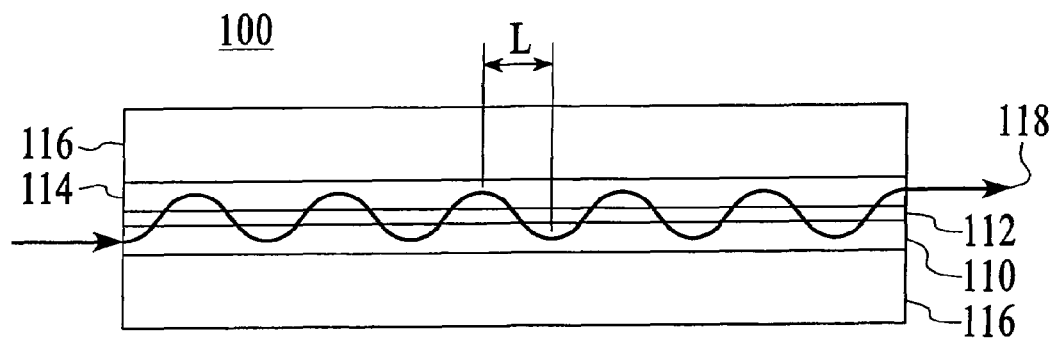
FIG. 1 (prior art) illustrates periodic evanescent coupling of optical power between two waveguides in a vertical directional coupler.

FIG. 1 illustrates the principle of evanescent coupling of optical power between two waveguides 110, 114 in a vertical directional coupler 100. In FIG. 1, two single-mode waveguides 110, 114 are vertically separated by a spacer layer 112 and sandwiched between cladding layers 116. Light 118 from a source propagates in the direction of the arrows. As shown in FIG. 1, light 118 couples between waveguide 110 and waveguide 114 at a regular interval. The length L, known as the coupling length, is a measure of the distance along the waveguides 110 and 114 needed for the light 118 to couple from the upper waveguide 114 to the lower waveguide 110 (or vice versa). As waveguides 110 and 114 are many coupling lengths L long, light 118 transfers between the waveguides 110, 114 many times. The characteristic length L is determined by the difference in the modal effective refractive indexes of the guided modes of the waveguide which is determined, in part, by the thickness of the spacer layer 112. The precision of modern epitaxial crystal growth techniques allows the thickness of the waveguides 110, 114 and spacer layer 112 to be defined within a relatively few nanometers such that the coupling of light from one guide layer to the other can be controlled to occur within a set distance L with a precision of better than one µm.

Figure 2:
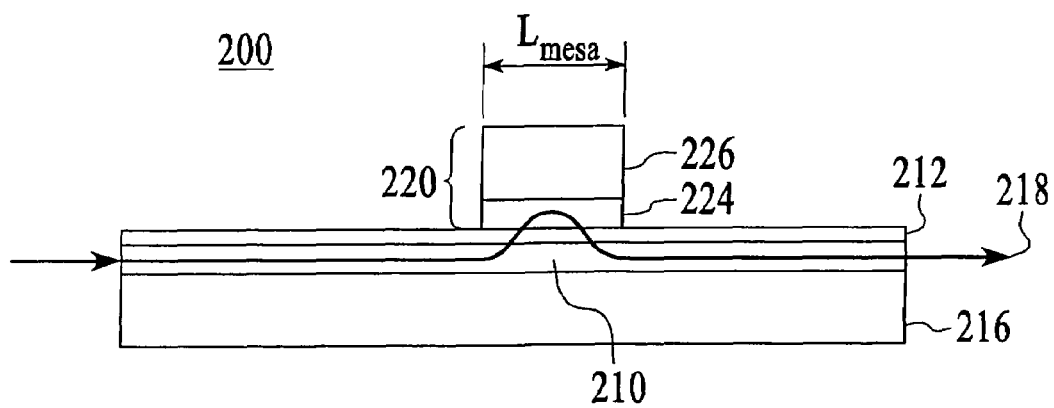
FIG. 2 illustrates vertical directional coupling of optical power between a waveguide and a SEED, in accordance with one embodiment of the present invention.

FIG. 2 illustrates vertical directional coupling of optical power between a waveguide 210 and a waveguide SEED 220, which can be formed as a mesa structure (also referred to as a SEED mesa). Cladding layer 216 lies below waveguide 210. Waveguide 210 is used for interconnect purposes and will sometimes be referred to as an interconnect waveguide. A portion of waveguide 210 on an input side of the SEED 220 will be sometimes referred to as an input waveguide; and a portion of waveguide 210 on an output side of the SEED 220 will sometimes be referred to as an output waveguide. A spacer cladding layer 212 lies on top of interconnect waveguide 210 and spaces waveguide 210 from SEED 220. The SEED mesa 220 comprises a waveguide 224 and cladding layer 226. The waveguide 224 typically forms the active region of the SEED and is engineered to produce the SEED effect. The SEED active region typically includes a multi-quantum-well (MQW) material. Interconnect waveguide 210 and SEED waveguide 224, along with cladding layers 216 and 226 and spacer layer 212, effectively form the waveguide portions of a vertical directional coupler.

Light 218 propagates in the direction of the arrows. As shown in FIG. 2, light 218 propagates through waveguide 210 until it reaches the region under SEED mesa 220, where it is coupled up to doped waveguide 224 of the SEED and interacts with the SEED MQW material before coupling back down to passive waveguide 210 at the exit side of the SEED 220. In one embodiment, the length $L_{mesa}$ of the SEED mesa 220 is chosen so that it is two coupling lengths long. The SEED waveguide 224 and the interconnect waveguide 210 are designed with similar modal indexes so that the light 218 couples efficiently between them. The small difference in the modal indexes determines the coupling length. Thus, in one embodiment, the physical lateral dimensions of the two waveguides 210, 224 are different from one another so as to compensate for different materials used in the two waveguides 210, 224 in order to provide the similarity of modal indexes.

The approach shown in FIG. 2 allows the monolithic integration of one or more SEEDs 220 with interconnect waveguides 210. The monolithic or single chip approach offers a simplified realization of complex logic functions compared to conventional surface-normal SEED circuits due to the elimination of out-of-plane interconnects. In one embodiment, epitaxial crystal growth and etchback methods are used to strategically locate SEEDs 220 on an interconnecting mesh of waveguides 210, as will be described in further detail below.

The approach shown in FIG. 2 was verified both by simulation and by proof-of-concept experiments (as will be described in connection with FIG. 3). One example simulation was based on a representative GaAs/AlGaAs vertical waveguide coupler operating at a wavelength of 850 nm, although operation at other wavelengths (e.g., 800-900 nm, 1500-1600 nm including the 1550 nm region, the 1650 nm region (L-band), and possibly out to 2000 nm) and/or using other materials systems (e.g., InGaAsP on InP, InGaAsP on GaAs, or GaINAs on GaAs) is also possible. The design of the simulation used $Al_{0.4}Ga_{0.6}As$ cladding 216, 226 and spacer 212 layers. The lower interconnect guide layer 210 was $Al_{0.175}Ga_{0.825}As$ while the upper simulated SEED waveguide layer 224 was $Al_{0.08}Ga_{0.92}As$. The composition of the simulated SEED layer was chosen to have the same effective refractive index of a GaAs/AlGaAs MQW SEED structure so that the design and subsequent proof-of-concept demonstration could be simplified by the substitution of uniform composition AlGaAs material without substantially altering the optical coupling and transmission performance.

A functioning SEED with waveguide interconnect can be designed using any of several known optical modeling methods, including the 3D Beam Propogation Method (BPM) and 3D Film Mode Matching. In this design, 3D Film Mode Matching software (FIMMWAVE by Photon Design, see A. S. Sudbo, Pure and Applied Optics, Vol. 2, pp. 211-233, 1993) was used to simulate propogation of light through the interconnect waveguides and SEED structure. The complete structure as illustrated in FIG. 3 was created in the simulation environment. The influence of various aspects of the design on coupling length and overall insertion loss were examined, resulting in the creation of various functioning designs.

Simulation showed effective coupling from an input side of the interconnect waveguide 210, to the waveguide SEED 220 and back to an output side of the interconnect waveguide 210, when the SEED 220 is in its transparent state. In this simulation, the coupling length from input waveguide 210 to SEED 220 to output waveguide 210 was 38 μm, a distance short enough that ultra-high speed modulation of the SEED 220 is possible. The simulation verified preservation of the mode quality and low optical scattering loss as light travels in and out of the SEED 220. In one implementation, 85% of optical power incident in the fundamental mode at the input side of the passive waveguide 210 emerged in the fundamental mode at the output side of the waveguide 210 after having gone through the upper waveguide layer 224 of the SEED mesa 220. Loss of approximately 0.7 dB is within the performance needs of SEED-based optical logic, particularly where regeneration of the light 218 is available at each logic gate. Coupling in a non-transparent state of the SEED 220 is less important since, by definition, the SEED 220 operates to block the incident light 218 in the non-transparent state.

The above discussion has focused on vertical confinement and manipulation of the light 218. In photonic circuits and other implementations, lateral confinement and routing of light within and between SEEDs is also important. Example structures that support lateral confinement are described below with reference to FIG. 3.

Figure 3:
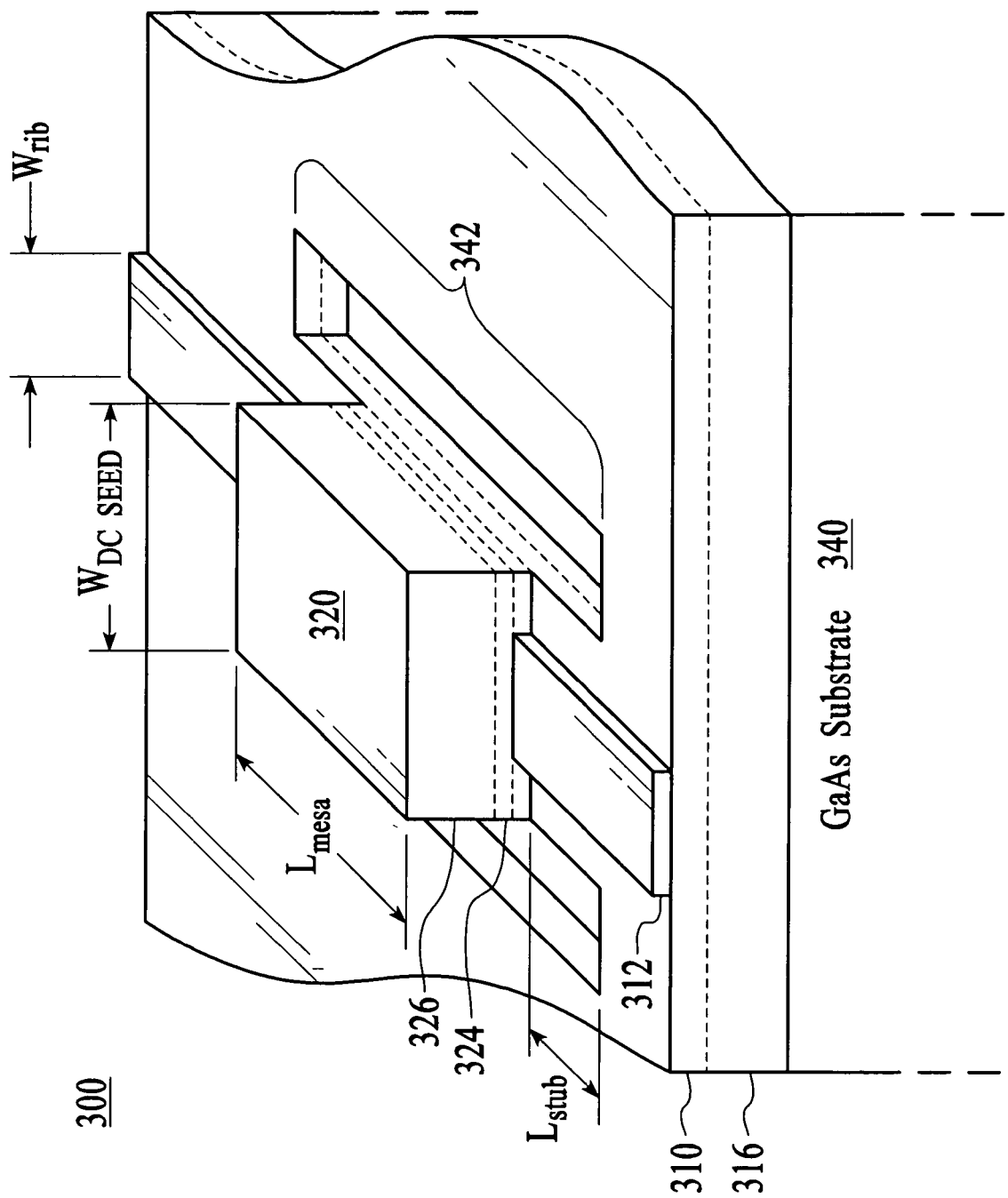
FIG. 3 illustrates the structure of one embodiment of a waveguide SEED and interconnect waveguide according to the present invention.

FIG. 3 illustrates a device 300 fabricated to demonstrate the coupling of light confined by a lower passive waveguide core 310 up into a SEED mesa 320 and back. The device 300 uses a GaAs substrate 340 for support. On top of that is a layer of $Al_{0.4}Ga_{0.6}As$ waveguide cladding 316 and then an $Al_{0.175}Ga_{0.825}As$ waveguide interconnect layer 310. Next is a spacer layer 312 of $Al_{0.4}Ga_{0.6}As$ waveguide cladding that forms a rib for the interconnect waveguide and also expands to form a base of the SEED mesa 320. In the SEED mesa 320, the layer on top of spacer layer 312 is the $Al_{0.08}Ga_{0.92}As$ guide layer 324. Finally, another layer of $Al_{0.4}Ga_{0.6}As$ waveguide cladding 326 is layered on top of the guide layer 324. Thus, waveguide SEED 320 includes the $Al_{0.08}Ga_{0.92}As$ guide layer 324 and the $Al_{0.4}Ga_{0.6}As$ waveguide cladding layer 326.

For the interconnect waveguide, the rib 312 laterally confines the propagation of light through the lower waveguide layer 310 to the area under the rib 312. However, under the SEED mesa 320, layer 312 extends laterally to form the base of the SEED mesa. Therefore, its effectiveness for lateral confinement is reduced. The device 300 also includes a trench 342 on either side of the SEED mesa 320. Trenches 342 extend downward through the waveguide interconnect layer 310 into the waveguide cladding layer 316. Trenches 342 extend beyond the length of the SEED mesa 320 on both sides by an amount $L_{stub}$. The trenches 342 assist in creating lateral confinement for both the upper and lower waveguide layers 310, 324 in the vicinity of the SEED mesa 320. These trenches typically do not cause light to be significantly guided in multiple lateral waveguide modes in the waveguide layers 310, 324. If care is taken to launch light into the fundamental mode of the SEED 320, then propagation of light within the device 320 will be largely that of the fundamental mode. The width of the rib 312 preferably is selected to launch the fundamental mode of the passive rib waveguide into the fundamental lateral mode of the SEED mesa 320. In one embodiment, the width $W_{rib}$ of the rib 312 outside the SEED mesa 320 is narrower than the width $W_{DC\ SEED}$ of the SEED mesa 320, as shown in FIG. 3.

In another implementation, after the device shown in FIG. 3 has been fabricated, new epitaxial layers of relatively large band-gap can be regrown surrounding the SEED mesa 320, or alternately optical polymers or glasses can be deposited around the SEED mesa 320. In one embodiment, these regrown or deposited materials are electrically highly resistive. Thus, this buried heterostructure implementation may allow better symmetry and greater modulation bandwidth.

In another implementation, rather than using etching to define the SEED mesa 320 and rib waveguide 312 to form the device 300 illustrated in FIG. 3, the technique of selective area disordering is used to increase the band-gap and reduce the refractive index of the MQW guide layer 324 and waveguide interconnect layer 310 in the areas that do not comprise the rib waveguide 312 and the SEED mesa 320. In this implementation, the waveguide interconnect layer 310 also comprises MQW material whose band gap is sensitive to the disordering process.

Figures 4A, 4B:
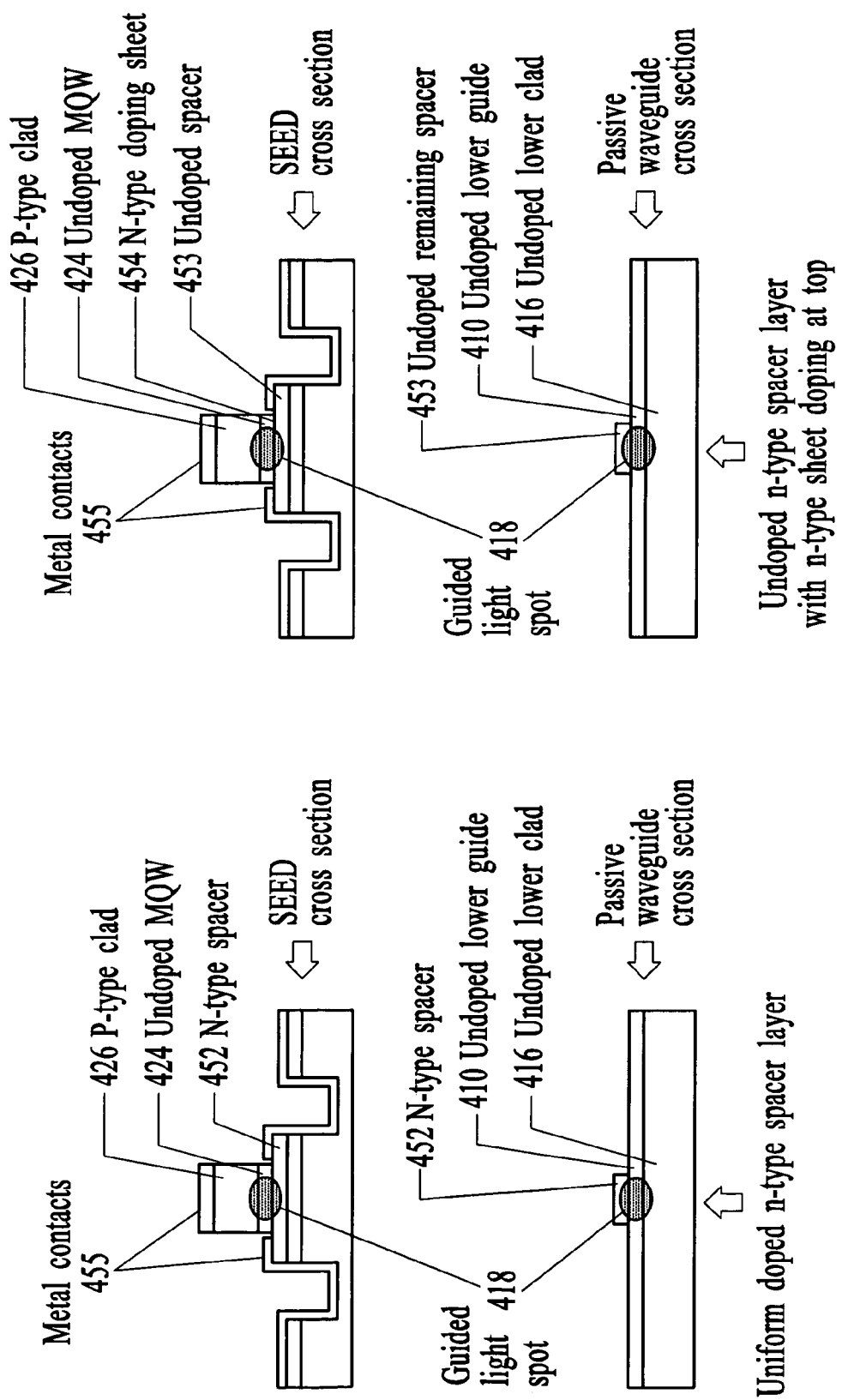
FIGS. 4A and 4B illustrate cross sections for two embodiments of an integrated SEED device according to the present invention.

FIGS. 4A and 4B show cross sections of two variations of an integrated SEED and passive waveguide. FIG. 4A shows a uniform doped n-type spacer layer 452; FIG. 4B shows an undoped spacer layer 453 topped with an n-type doping sheet 454. These cross sections illustrate two concepts for electrical contact to the SEED p-n junction while reducing free-carrier absorption in the passive waveguide interconnects. High-quality ohmic contacts in a low-parasitic-capacitance configuration can increase switching speed. Using n-type doped epitaxial layers below the undoped MQW SEED layers 424 would allow for easy contacting of the SEED p-n junction but may also cause excessively high free-carrier induced losses within the lower passive waveguide.

In FIG. 4A, only the spacer layer 452 is doped n-type, and all layers below the spacer 452 are left undoped. Thus, the passive waveguide 410 becomes substantially undoped. Therefore, only the rib comprising the spacer layer 452 contributes free-carrier loss to the passive waveguide 410. FIG. 4A also shows a modification of the SEED mesa used for contacting the SEED. The p-type cladding layer 426 and the undoped MQW layer 424 are narrower than the n-type spacer layer 452. Thus, a ledge formed on both sides of the SEED mesa exposes the surface of the n-type spacer layer 452. N-type ohmic contact is made to the top of the spacer layer 452 using metal contacts 455, with an additional p-type metal contact being provided above the p-type cladding layer 426.

In FIG. 4B, the spacer layer 453 is substantially undoped with the exception of a thin doping sheet 454 near the interface with the MQW layer 424. Ohmic contact to the MQW SEED in this embodiment is the same as for the uniformly doped spacer 452 using metal contacts 455. However, if care is taken to etch away the doping sheet 454 from the top of the passive rib waveguide 453 while leaving the undoped spacer material 453 intact (i.e., the undoped remaining spacer in FIG. 4B), the passive waveguide 410 becomes completely undoped and does not show free-carrier absorption beyond that of the normal background impurity concentrations.

The specific design of the SEED devices shown will depend in part on the end application. Although longer SEED length is correlated with increased absorption for the non-transparent state, shorter SEED length is correlated with increased switching speed. Thus, although a minimum length is needed to allow enough light to be absorbed in the SEED in the non-transparent state so that very little light reappears in the lower waveguide, a compact SEED device that meets this requirement is preferred for high speed applications. In one implementation, the SEED design is 38 µm long by 3 µm wide. This total device area of 114 µm$^2$ is comparable to surface-normal SEED devices produced, for example, at Sandia National Laboratories, Albuquerque, N. Mex. These surface-normal devices operating with 7 ps switching times have an area of approximately 85 µm$^2$, suggesting that, with a slight narrowing of the mesa to 2.25 µm width, the SEED of the present invention can be expected to exhibit 5 ps to 10 ps switching times in one embodiment. Such dimensions can be achieved by standard contact-print microfabrication techniques.

The deep trenches 342 at the sides of the SEED device 300 in FIG. 3 impact the overall transmission loss. The slight waveguide discontinuity at the ends of the trenches 342 can create reflections. These reflections can form a resonant cavity surrounding the SEED 300 causing a resonant modulation of the overall light transmission through the device 300. Although this resonant modulation is weak, the length by which the trenches 342 extend beyond the length of the SEED mesa 320 on both sides, i.e., the "stub" length or $L_{stub}$, can be adjusted to increase the light transmission.

Figure 5:
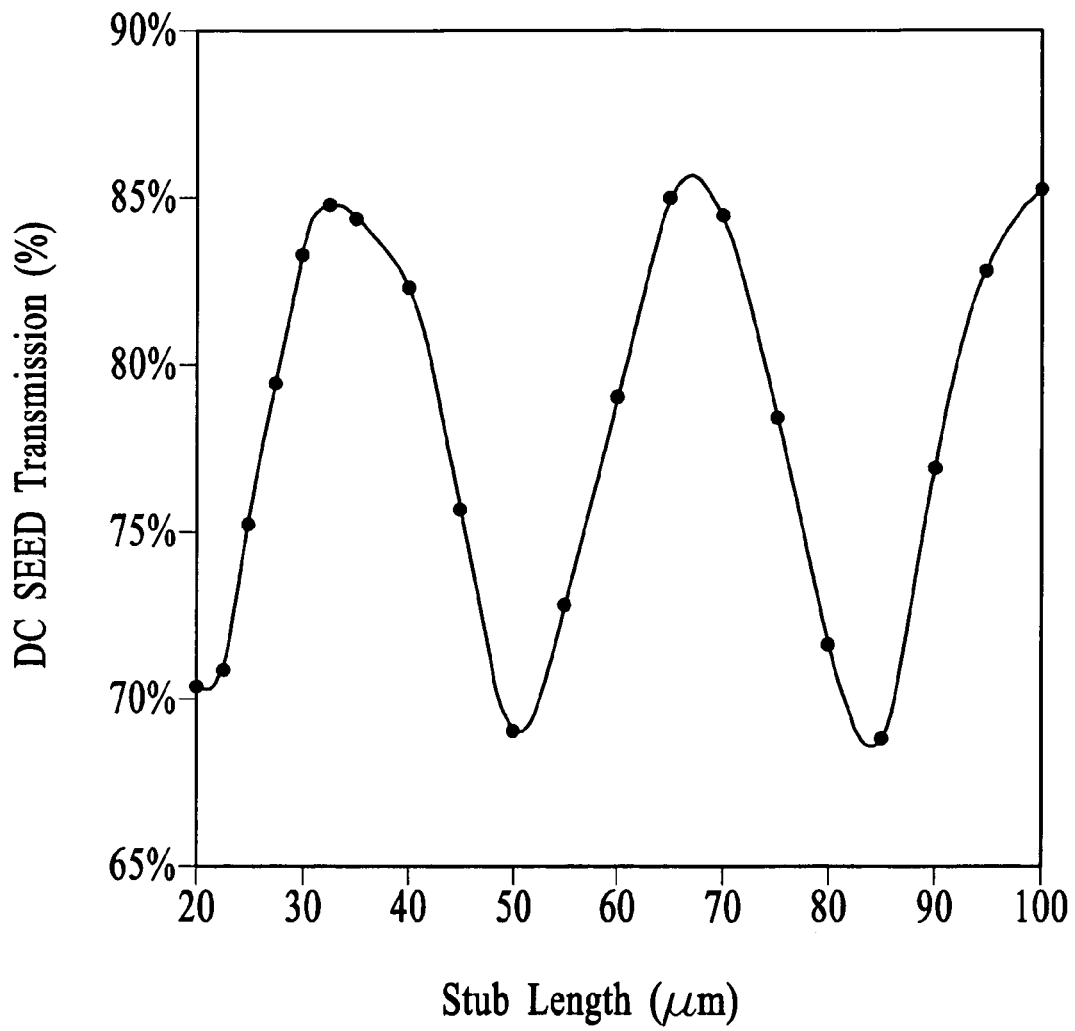
FIG. 5 is a plot of percent SEED transmission as a function of stub length.

FIG. 5 shows a plot of SEED transmission as a function of stub length in µm. Transmission modulation is a result of multiple reflections of light from the ends of the stub waveguide. Correct tuning of the stub length $L_{stub}$ can improve transmission, at a given wavelength, by as much as 16% in this example. The preferred lengths of the stubs are those resonant lengths that minimize optical loss in transmission through the overall structure. In general, this set of lengths occurs at $L_{stub}=\lambda/(2n_{eff})$ where $n_{eff}$ is the effective index of refraction of the waveguide mode.

Figure 6:
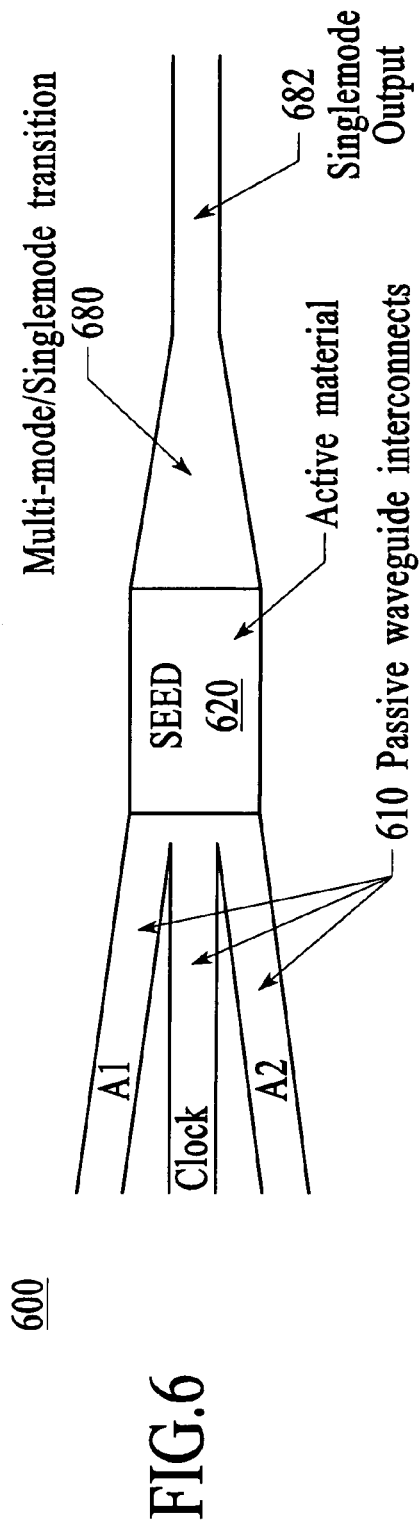
FIG. 6 is a schematic of one embodiment of a waveguide SEED device with three inputs through passive waveguide interconnects and a single output through a transition segment into a single mode output waveguide interconnect.

The SEED devices described above can be coupled to form more complex logic elements and Boolean logic gates, as described in FIGS. 6-9. In one embodiment, at least two signal inputs to each waveguide SEED device are used to implement optical logic. FIG. 6 shows an example schematic of a waveguide SEED device 600 comprising a waveguide SEED 620 with two logic input waveguides receiving logical inputs A1, A2 and one clock input waveguide receiving a clock input. In FIG. 6, the logic input waveguides and clock input waveguide are collectively labeled as passive waveguide interconnects 610. In one embodiment, logical inputs A1, A2 are routed in single-mode logic input waveguides 610. Use of single-mode logic input waveguides 610 reduces dispersion as compared to multimode waveguides.

In the implementation shown in FIG. 6, the waveguide SEED 620 supports multiple transverse optical modes. Logical inputs A1 and A2 are coupled into the SEED 620 so as to excite high-order modes therein while the clock input is coupled into the fundamental mode of the SEED 620. In this manner, the effects of interference between signals A1 and A2 are lessened. For example, if a single mode SEED 620 were used with A1 and A2 exactly out of phase, the combined signal would not couple into the guided mode of the SEED 620, but would instead couple into substrate radiation modes. On the other hand, a multimode SEED 620 will capture light from both A1 and A2 logical inputs regardless of the relative phase of these signals.

In the implementation shown in FIG. 6, the clock input is coupled into the fundamental mode of the SEED 620 so as to enable narrowing of the output waveguide from a multimode/singlemode transition segment 680 to a waveguide segment 682 that supports only a single mode. The A1 and A2 logical inputs preferably are provided in advance of the clock signal and the SEED 620 preferably is designed to support high efficiency of clock transmission through the SEED 620. The single-mode output waveguide 682 can then be routed to the next stage of the logic element. A preset signal (not shown) is generated at a separate time from all other inputs (i.e., A1, A2, clock), and it may be coupled into any of the three input waveguides 610 without consideration for mode control, or by a separate input waveguide receiving preset input AP as shown in FIG. 7.

Figure 7:
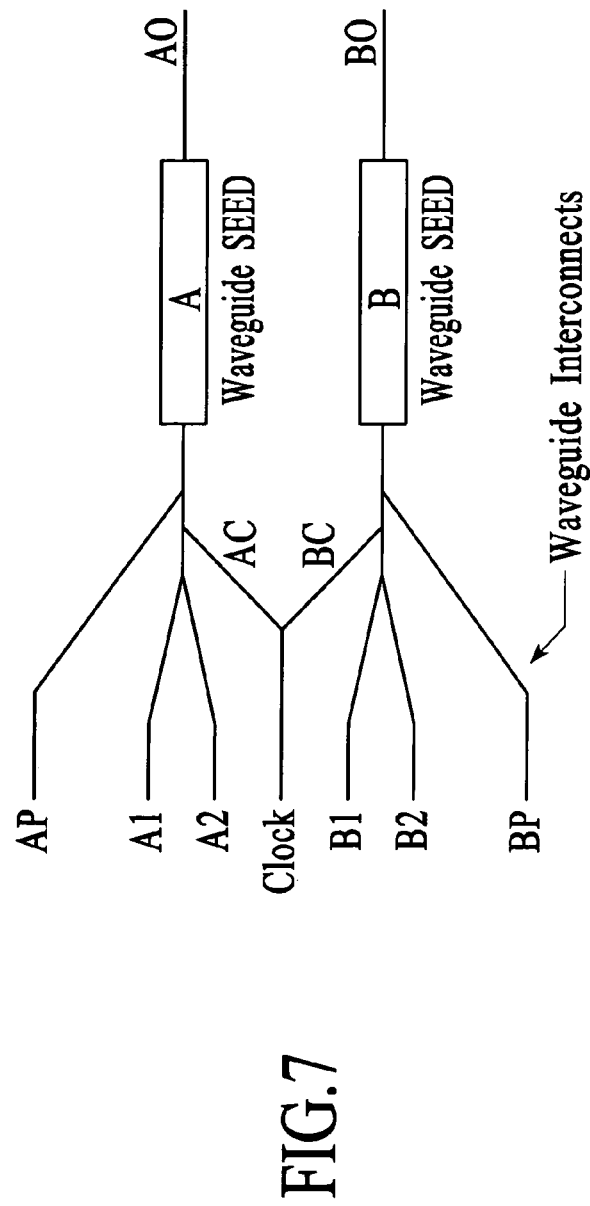
FIG. 7 is a schematic of one embodiment of an optical NOR gate using waveguide SEEDs.

FIG. 7 shows an example schematic of an optical NOR Boolean logic gate formed according to the present invention. Since use of waveguide optics can eliminate out-of-plane couplings and simplify signal paths, the overall size of complex logic elements can be reduced. In one embodiment, the size of the waveguide NOR gate is within the range of 500 to 1000 microns in length and approximately 100 microns in width. The width is determined largely by the combined width of the input waveguides. In some embodiments, additional width may be needed to accommodate the electrical bias circuitry. These estimates lead directly to a gate density of 5 to 8 NOR gates per square millimeter for the core NOR functionality.

In some embodiments, complex interconnections use waveguide combiners and splitters. One embodiment of a waveguide splitter technology is the lateral-mode interference (LMI) device. An LMI device is formed by abruptly coupling a single mode guide to a wider multimode section that supports, for example, 12 TE-like modes. These modes are excited by the input optical field of the single-mode guide. Because each of the modes in the wide section travel at a different phase velocity, the composite power distribution within the multimode guide varies with length and forms distinct image points along the length of the guide where 1×N power splitting is achieved with low excess loss. For example, 1×2 splitting may be achieved after propagation of a certain distance and 1×3 splitting may be achieved after propagation of another distance. Then, 1×2 splitting can be achieved if the multimode section is terminated at the 1×2 split point and joined to two single-mode guides aligned with the intensity maxima of the multimode section. Similarly, a 1×3 splitter or other types of splitters can also be formed.

Figure 8:
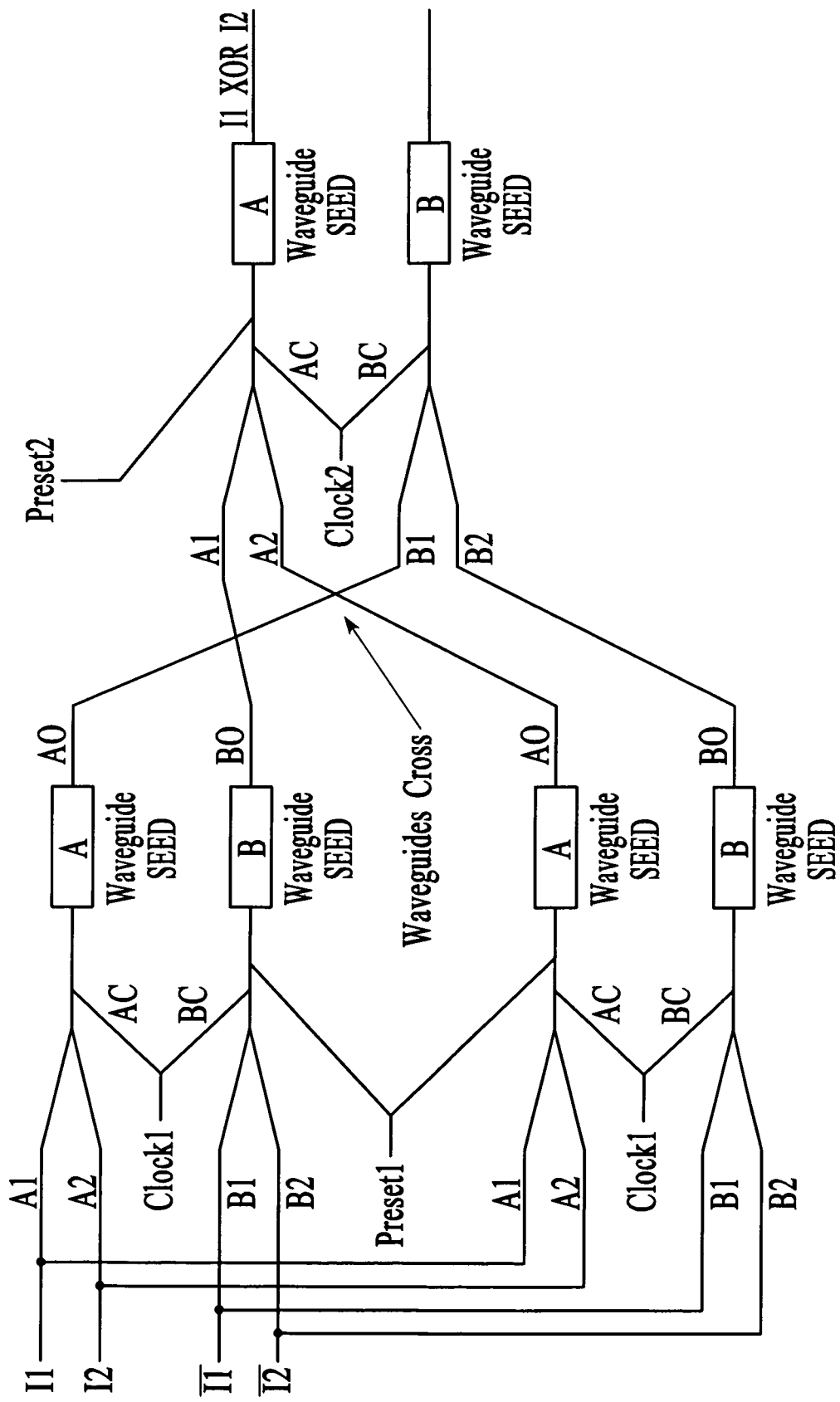
FIG. 8 is a schematic of one embodiment of an optical XOR gate using waveguide SEEDs.

FIG. 8 shows an example schematic of an optical XOR Boolean logic gate according to the present invention. The clock and preset sources are omitted for clarity. One advantage of the waveguide SEED implementation of an optical XOR gate is that the cascading elements of FIG. 8 do not require additional bulky optics for connections as would be required using conventional surface-normal SEEDs. At this level of complexity as exemplified by FIG. 8, in some implementations, it may be desirable for waveguides to cross each other in order to make the correct signal connections. Waveguide crossings preferably are achieved with a low amount of crosstalk. In some experiments, crosstalk as low as a few tenths of a decibel have been achieved. In one embodiment, a two-level waveguide configuration is used to reduce the crosstalk present in single level waveguides. Light at crossing points couples to an upper waveguide bridge, crosses over another waveguide, and then couples back down to the first level. Vertical directional couplers can be used for this purpose.

Figure 9:
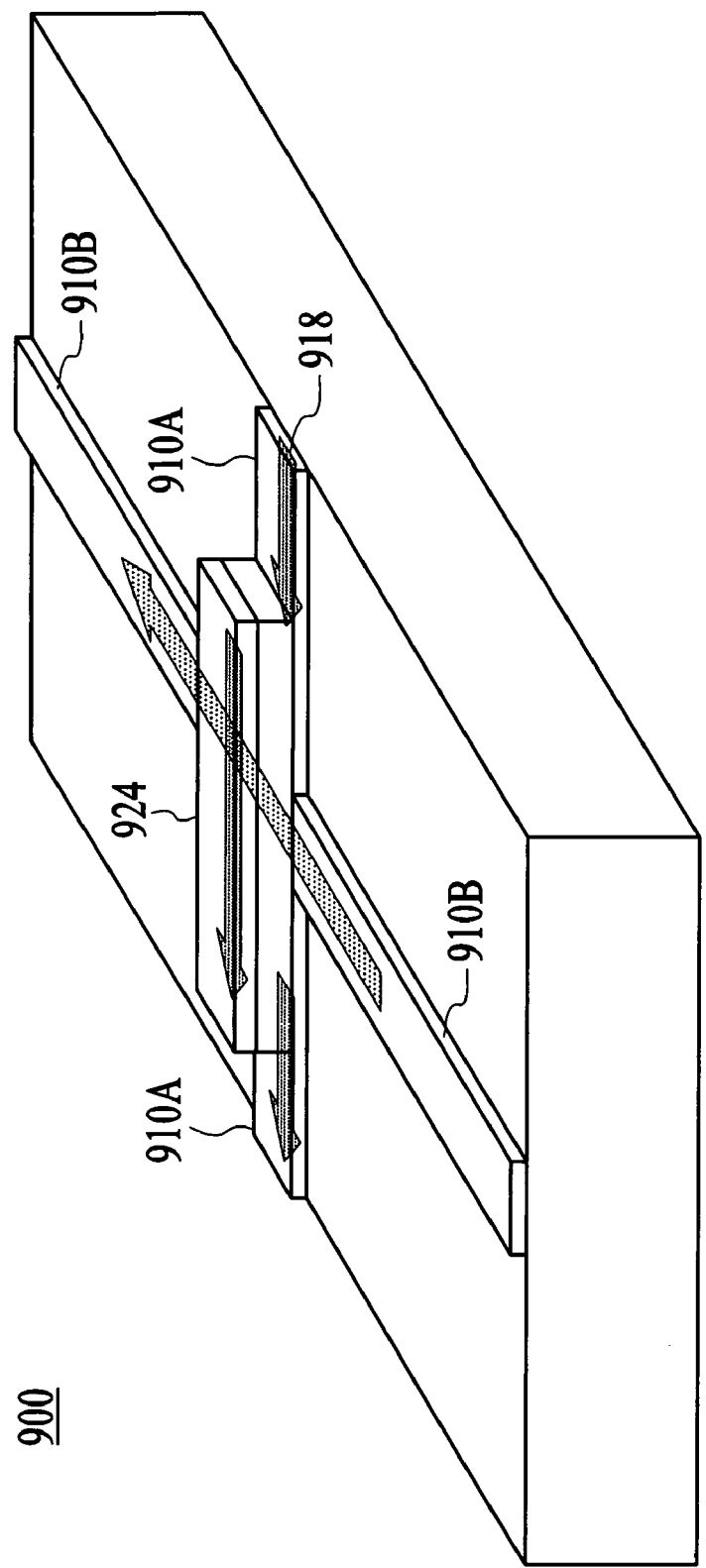
FIG. 9 illustrates one embodiment of a waveguide crossing via a waveguide bridge, in accordance with the present invention.

FIG. 9 shows an example of a waveguide crossing 900 via a waveguide bridge 924. In some embodiments, the mesa etches used to form the waveguide SEED can also be used to fabricate a vertical coupler waveguide crossing bridge 924 centered on the cross point. Light 918 traveling along lower waveguide 910A evanescently couples up into the bridge waveguide 924, passes over the lower waveguide 910B and then evanescently couples back down into the lower waveguide 910A.

In one embodiment, the upper waveguide 924 comprises MQW material similar to that used in the waveguide SEED so that the upper waveguide and the waveguide SEED can be fabricated in the same epitaxial growth and fabrication process. Loss due to absorption at the operating wavelength can be reduced by vacancy-enhanced disordering of the MQW in the cross region. Such disordering is capable of shifting the absorption edge of the MQW, rendering it substantially transparent at the operating wavelength. In another implementation, the MQW material in the upper waveguide 924 could be electrically forward-biased to act as an integrated semiconductor optical amplifier (SOA) to amplify the light guided therein. This would form an active waveguide cross which can have zero or even negative insertion loss. Alternatively, SOAs can be fabricated by using the SEED structure under forward bias.

Various other modifications, changes and variations which will be apparent to those skilled in the art may be made in the arrangement, operation and details of the method and apparatus of the present invention disclosed herein without departing from the spirit and scope of the invention as defined in the appended claims. For example, symmetric SEED pairs, as are known in the art, can be used in combination with the optical Boolean logic gates described above, for optical computing applications. Other types of Boolean logic gates can be formed according to the teachings of the present invention. As another example, the material in the MQW guide layer 324 of the SEED 300 can also be used as a photo detector by operating with a reverse electrical bias to absorb the light and generate a photocurrent. A number of these SEEDs can be placed in series along a lower waveguide carrying a data signal. If there is no bias applied, the SEED can remain transparent. If there is a forward bias applied, the SEED can provide gain to the signal. If the data stream passes to a SEED that is reverse biased, the data stream can be absorbed and converted to electrical signals. Thus, by application of a combination of biases to various SEEDs, a signal router is formed that contains a built-in optical-to-electrical conversion.

The invention is not limited to the specific geometries described above. For example, the positions of the interconnect waveguide and SEED can be reversed. The interconnect waveguide may be positioned above the SEED rather than below it. Other variations will be apparent. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A directionally coupled SEED device comprising:
    a substrate;
    a waveguide fabricated on the substrate; and
    a self-electrooptic effect device (SEED) fabricated on the substrate, the SEED having an active waveguide layer positioned to form a vertical directional coupler with the waveguide.

2. The directionally coupled SEED device of claim 1 wherein the active waveguide layer comprises a multiple quantum well (MQW) material.

3. The directionally coupled SEED device of claim 1 further comprising:
    a spacer layer positioned between the active waveguide layer of the SEED and a core layer of the waveguide.

4. The directionally coupled SEED device of claim 3 wherein the spacer layer forms a rib for lateral confinement of light within the waveguide.

5. The directionally coupled SEED device of claim 1 wherein the SEED comprises a SEED mesa.

6. The directionally coupled SEED device of claim 5 wherein the SEED mesa comprises:
    a spacer layer positioned between the active waveguide layer of the SEED and a core layer of the waveguide;
    the active waveguide layer of the SEED; and
    a cladding layer located above the active waveguide layer of the SEED.

7. The directionally coupled SEED device of claim 6 wherein the spacer layer is doped and the active waveguide layer of the SEED is narrower than the spacer layer to allow electrical contact to the spacer layer.

8. The directionally coupled SEED device of claim 6 wherein the spacer layer comprises a doped sheet on top of an undoped layer.

9. The directionally coupled SEED device of claim 5 further comprising:
    trenches located on either side of the SEED mesa for lateral confinement of light within the SEED mesa.

10. The directionally coupled SEED device of claim 9 wherein the trenches include stubs that extend beyond at least one end of the SEED mesa.

11. The directionally coupled SEED device of claim 9 wherein the trenches include stubs that extend beyond at least one end of the SEED mesa and a length of at least one of the stubs is approximately $L_{stub}=\lambda/(2n_{eff})$ where $n_{eff}$ is the effective index of refraction of a waveguide mode of the SEED device.

12. The directionally coupled SEED device of claim 1 wherein the SEED has a switching speed faster than 10 ps.

13. The directionally coupled SEED device of claim 1 wherein the SEED and the waveguide comprise AlGaAs.

14. The directionally coupled SEED device of claim 1 wherein the SEED and the waveguide comprise InGaAsP.

15. The directionally coupled SEED device of claim 1 wherein the SEED and the waveguide comprise GaInNAs.

16. The directionally coupled SEED device of claim 1 wherein the waveguide and the SEED are operable at a wavelength in the range of 800 to 900 nanometers.

17. The directionally coupled SEED device of claim 1 wherein the waveguide and the SEED are operable at a wavelength in the range of 1.5 to 1.6 microns.

18. The directionally coupled SEED device of claim 1 wherein the waveguide is a single mode waveguide.

19. The directionally coupled SEED device of claim 1 wherein the waveguide is a rib waveguide.

20. The directionally coupled SEED device of claim 1 wherein the waveguide is an undoped waveguide.

21. The directionally coupled SEED device of claim 1 wherein the waveguide is a passive waveguide.

22. An optical logic device comprising:
a substrate;
at least two logic input waveguides fabricated on the substrate; and
a waveguide self-electrooptic effect device (SEED) fabricated on the substrate, the waveguide SEED having an active waveguide layer positioned to form a vertical directional coupler with the input waveguides.

23. The optical logic device of claim 22 wherein the active waveguide layer is a multimode active waveguide layer.

24. The optical logic device of claim 23 wherein the logic input waveguides are single mode waveguides.

25. The optical logic device of claim 22 further comprising:
a clock input waveguide fabricated on the substrate, wherein the active waveguide layer forms a vertical directional coupler with each of the two logic input waveguides and with the clock input waveguide.

26. The optical logic device of claim 22 wherein the optical logic device optically implements a Boolean logic gate.

27. The optical logic device of claim 20 further comprising at least one logic output waveguide.

28. A photonic logic circuit comprising:
a substrate;
a plurality of optical logic devices fabricated on the substrate, each optical logic device comprising:
at least one logic input waveguide;
at least one logic output waveguide; and
a self-electrooptic effect device (SEED) fabricated on the substrate, the SEED having an active waveguide layer positioned to form a vertical directional coupler with the input and output waveguides; and
at least one optical interconnect fabricated on the substrate, with each optical interconnect coupling the logic output waveguide of one of the plurality of optical logic devices to the logic input waveguide of another of the plurality of optical logic devices.

29. The photonic logic circuit of claim 28 wherein the optical interconnects comprise waveguides and at least one waveguide crossing.

30. The photonic logic circuit of claim 29 wherein the waveguide crossing comprises a vertically coupled waveguide bridge.

* * * * *